D. A. McCLOY.
BABY CARRIAGE.
APPLICATION FILED NOV. 16, 1909.

1,008,173.

Patented Nov. 7, 1911.

2 SHEETS—SHEET 1.

WITNESSES:

INVENTOR.
David A. McCloy
BY Ridout & Maybee
ATTORNEYS

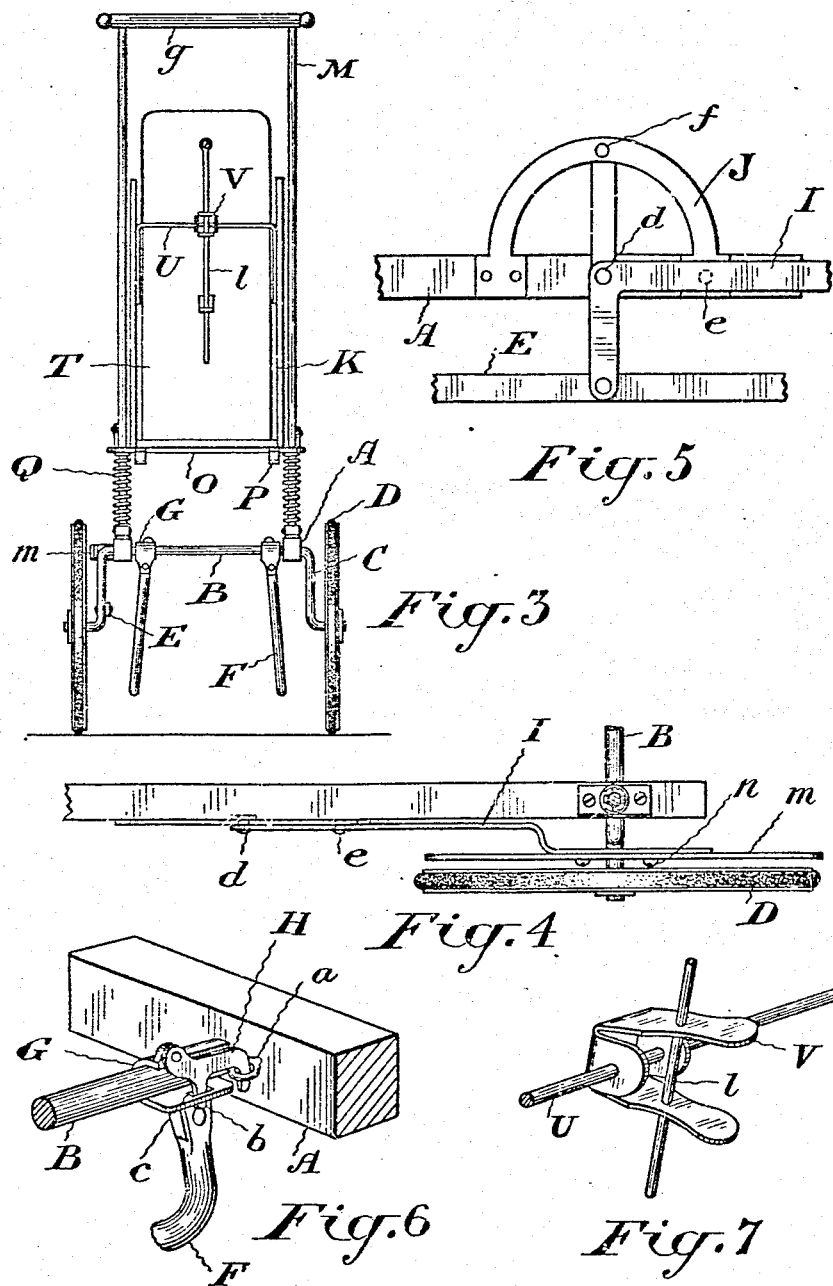

UNITED STATES PATENT OFFICE.

DAVID ALFRED McCLOY, OF STRATFORD, ONTARIO, CANADA.

BABY-CARRIAGE.

1,008,173.　　　　　Specification of Letters Patent.　　Patented Nov. 7, 1911.

Application filed November 16, 1909. Serial No. 528,353.

*To all whom it may concern:*

Be it known that I, DAVID ALFRED Mc-CLOY, of the city of Stratford, county of Perth, Province of Ontario, Canada, have invented certain new and useful Improvements in Baby-Carriages, of which the following is a specification.

My invention relates to a baby carriage intended for use as a wheeled vehicle and as a sleigh, and my object is to devise a carriage which can in a few seconds be converted for one use or the other.

A further object is to so arrange the vehicle that it may quickly be folded into compact form when desired.

I attain my objects by a construction which may be briefly described as follows. The axles of the vehicle are journaled in the frame and runners are detachably journaled thereon. Cranks are formed at the ends of the axles and carry the wheels. Means are also provided whereby the body of the carriage is normally spring supported above the frame but may be swung down in proximity thereto when desired. The body is provided with an adjustable back, and also with an adjustable combined foot rest and dash as hereinafter more specifically described.

Figure 1:
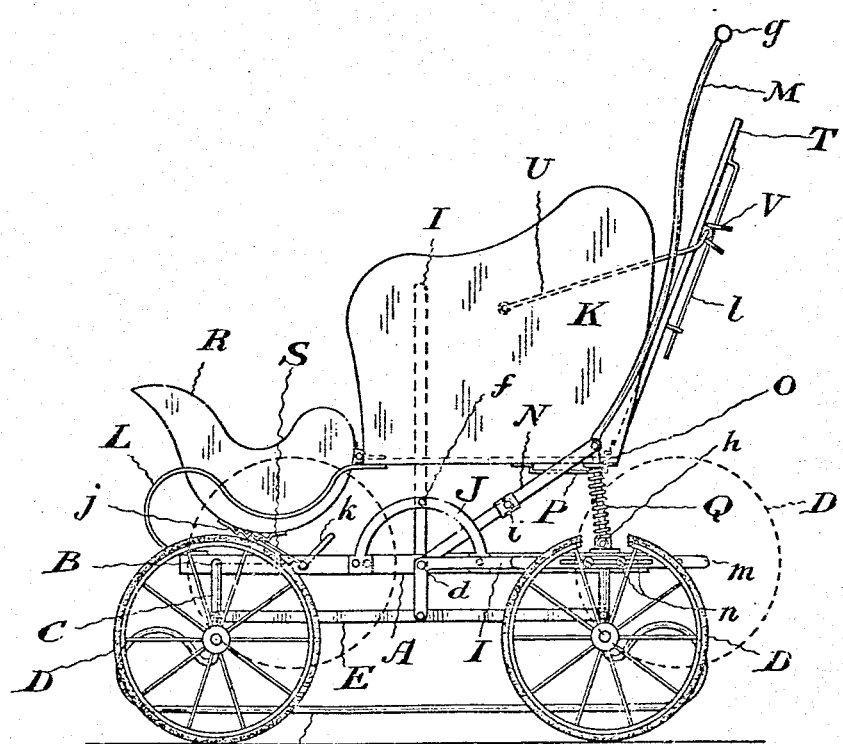
Figure 2:
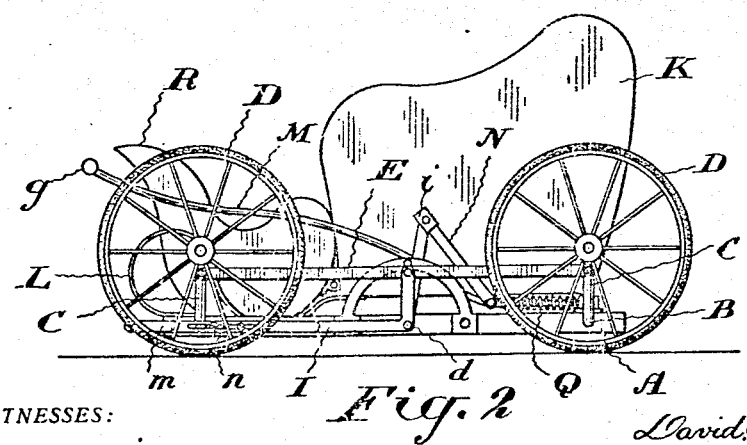

Figure 1 is a side elevation of a baby carriage constructed in accordance with my invention and as used as a wheeled vehicle. Fig. 2 is a similar view showing the carriage folded. Fig. 3 is a rear elevation of the carriage. Fig. 4 is a plan view showing an adjusting lever. Fig. 5 is a side elevation of part of the adjusting lever and the retaining quadrant therefor. Fig. 6 is a perspective detail showing one of the detachable journals or connections between the runners and the axles. Fig. 7 is a perspective detail of the bail holding the back in position.

In the drawings like letters of reference indicate corresponding parts in the different figures.

A is the frame of the running gear of the carriage, which may be of any suitable construction. On this frame are journaled the axles B. These axles are each provided with a crank C at each end, on the end of which cranks are journaled the wheels D. The cranks are connected at one side by the coupling bar E suitably pivoted thereto. From this arrangement it follows that the wheels of the carriage may be caused to occupy the position shown in full lines in Fig. 1, or raised as indicated in dotted lines in Fig. 1 and in full lines in Fig. 2. The extent of the lift depending on the angle through which the cranks C are swung. One purpose in thus raising the wheels is to lower the carriage so that the runners F may be brought into contact with the ground. These runners preferably each comprise a metal bar bent up at each end and detachably secured at each end to the front and rear axles B, as shown. A suitable detachable connection for the runners is shown in Fig. 6. A half sleeve G is formed to fit on the axle as shown. To the under side of the sleeve the end of the runner is secured. On the sleeve is pivoted a latch H. This latch is hook-shaped at its end and engages an eye $a$, secured to the frame A. As an additional security a lug $b$ may be formed on the latch adapted to enter a hole $c$ in the lower part of the sleeve G. This construction securely holds the end of the runner in place and at the same time can be easily and quickly disconnected when it is desired to remove the runners. It will be noted particularly on reference to Fig. 1 that when the wheels are raised, as shown in dotted lines, that the runners will support the weight of the carriage, which may then be used as a sleigh.

To move the wheels as above described I provide the following mechanism. A bent lever I is fulcrumed at $d$ on the frame. The short arm is pivotally connected with the coupling bar E, while the long arm preferably extends rearwardly as shown when the wheels are in contact with the ground. A retaining quadrant J is provided, secured to the frame and the lever is provided with a pin $e$ adapted to engage any one of the notches $f$ formed in the quadrant. The lever being of light springy metal the pin can be readily engaged with or disengaged from any desired notch. When this lever is swung to the position shown in dotted lines the wheels are held raised, as shown in dotted lines also. By swinging the lever to the front the wheels may be raised still farther. I prefer to make the lever I comparatively short and to provide it with an extension m, slidable on the lever and connected therewith by a suitable slot and bolt connection n. Ordinarily this extension is pushed in but when the advantage of the extra leverage is desired it may be pulled out as far as may be necessary.

The body of the vehicle is connected with the frame in such a manner that it may be, when desired, folded down in close proximity thereto. To enable this to be accomplished I have devised the following construction. The body K of the carriage is supported from the front end of the frame by means of the long bent springs L. The handles M, which are connected as usual by a cross bar g, are pivoted at their lower ends on the sides of the frame A, as shown at h. They are normally held in position by means of the braces N. These braces are preferably provided intermediate their ends with rule joints i and the ends of the braces are pivotally connected respectively with the frame and with the handles. By bending up the braces the handles may be swung forward as shown in Fig. 2. The lower end of each handle is substantially straight and these straight portions are connected by a cross bar O, through the ends of which the handles pass, the cross bar being movable thereon. This cross bar passes through the slotted guideways P, secured to the under side of the body. Thus, when the handles are drawn down, as shown in Fig. 2, the body of the vehicle is also drawn down, the springs L being sufficiently flexible to permit of this movement.

To give the desired spring support to the rear end of the body of the carriage I place on each handle below the cross bar a spring Q. Through the medium of the cross bar O the rear end of the body of the carriage is supported by these springs. These springs, of course, cease to be active when the body is folded down, as shown in Fig. 2.

On the front of the body is hinged a combined foot support and dash R. This may be vertically adjusted as required by means of a bail S, pivoted on the frame of the carriage and adapted to engage any one of the teeth of the rack j secured to the under side of the foot support. The bail may be moved through the medium of the arm k formed thereon.

The back T is hinged at its lower end to the body of the carriage and is provided with the following adjusting mechanism. A bail U is pivoted at each end to the inner sides of the sides of the body. This bail is provided with the spring clip V, having holes therein, through which passes the rod l secured to the back. The fingers, tending to spread, thus grip the rod but when pressed together by the fingers release the same in the manner well-known in ordinary transom lifts. This arrangement permits the back to be adjusted to any angle and also enables it to be folded down inside the body when the carriage is folded.

From the above description it will be seen that I have devised a construction which satisfactorily accomplishes the objects of my invention as set out in the preamble to the specification.

What I claim as my invention is:—

1. In a vehicle the combination of a frame; a body spring-mounted on the frame; means for drawing said body down into juxtaposition with the frame; wheels on which the frame is mounted; and means for vertically adjusting said wheels whereby they may be lowered to working position or raised to overlap the sides of the body.

2. In a vehicle the combination of a frame; a body; a handle pivoted on the frame at each side; a cross bar connecting the handles; slotted guideways at the under side of the body, through which said cross bar passes; releasable braces, bracing the handles to the frame; and yielding means supporting the forward end of the body from the frame.

3. In a vehicle the combination of a frame; a body; a handle pivoted on the frame at each side; a cross bar connecting the handles and slidable thereon; coil springs on the handles engaging the under side of the cross bar; slotted guideways at the under side of the body, through which passes said cross bar; releasable braces, bracing the handles to the frame; and yielding means supporting the forward end of the body from the frame.

4. In a vehicle the combination of a frame; a body; a handle pivoted on the frame at each side; a cross bar connecting the handles; slotted guideways at the under side of the body, through which passes the said cross bar; a divided rule-jointed brace extending forward from each handle and pivotally connected with the handle and with the frame; and yielding means supporting the forward end of the body from the frame.

5. In a vehicle the combination of a frame; a body; a handle pivoted on the frame at each side; a cross bar connecting the handles and slidable thereon; coil springs on the handles engaging the under side of the cross bar; slotted guideways at the under side of the body; through which passes said cross bar; a divided rule-jointed brace extending forward from each handle and pivotally connected with the handle and with the frame; and yielding means supporting the forward end of the body from the frame.

6. In a vehicle the combination of a frame; a body spring-mounted on the frame; an adjustable dash and foot rest hinged on the front of the body; an adjustable back hinged at the back of the body; means for drawing said body down into juxtaposition with the frame; wheels on which the frame is mounted; and means for vertically adjusting said wheels whereby they may be lowered to working position or raised to overlap the sides of the body.

Toronto, this 16th day of October 1909.

DAVID ALFRED McCLOY.

Signed in the presence of—
R. T. HARDING,
EDITH ROBERTSON.

Copies of this patent may be obtained for five cents each, by addressing the "Commissioner of Patents, Washington, D. C."